P. J. RYAN.
DETACHABLE HORSESHOE CALK.
APPLICATION FILED JAN. 11, 1915.
1,141,726.
Patented June 1, 1915.
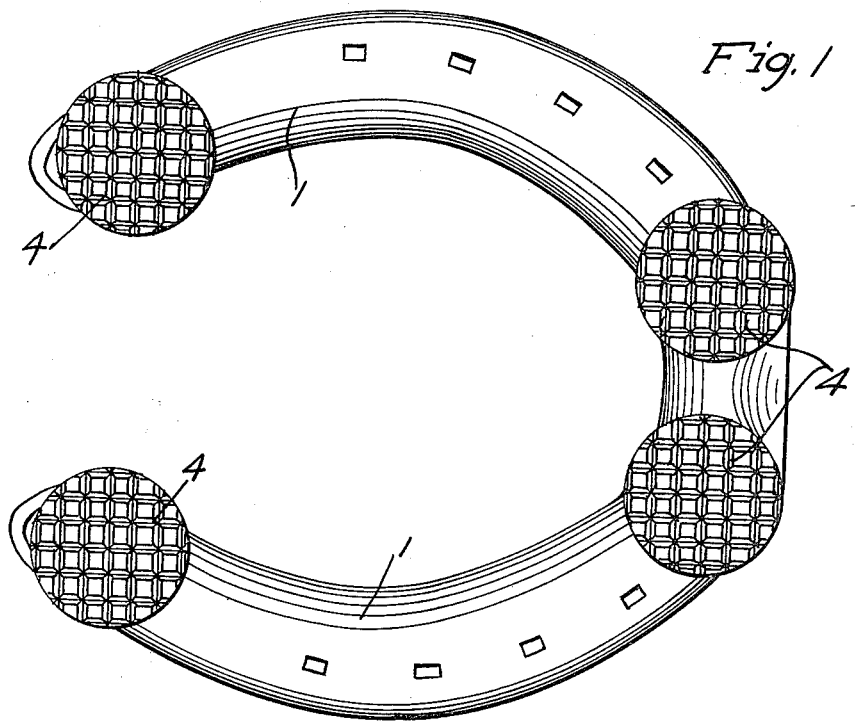
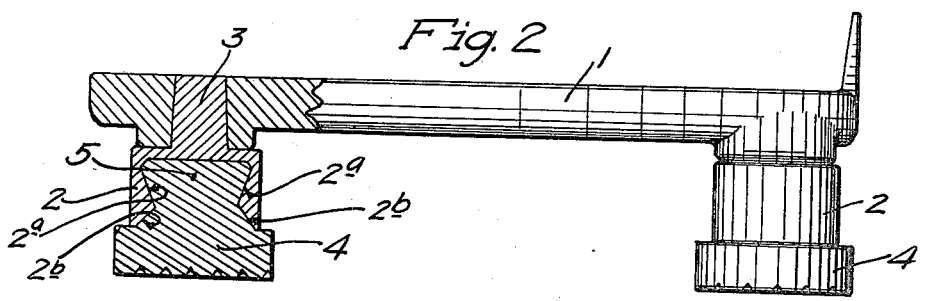
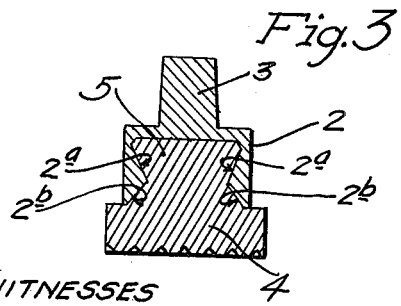
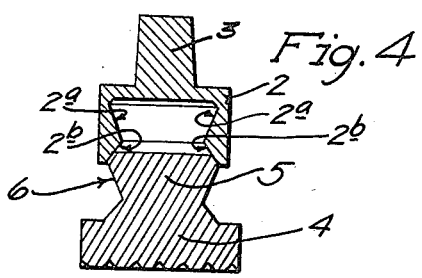
WITNESSES
E. C. Skinkle
A. H. Opsahl
INVENTOR
Patrick J. Ryan
BY HIS ATTORNEYS
Williamson & Merchant

UNITED STATES PATENT OFFICE.

PATRICK J. RYAN, OF MINNEAPOLIS, MINNESOTA.

DETACHABLE HORSESHOE-CALK.

1,141,726. Specification of Letters Patent. Patented June 1, 1915.

Application filed January 11, 1915. Serial No. 1,523.

*To all whom it may concern:*

Be it known that I, PATRICK J. RYAN, a citizen of the United States, residing at Minneapolis, in the county of Hennepin and State of Minnesota, have invented certain new and useful Improvements in Detachable Horseshoe-Calks; and I do hereby declare the following to be a full, clear, and exact description of the invention, such as will enable others skilled in the art to which it appertains to make and use the same.

My invention relates to horse shoes of the type that are provided with replaceable calks, and has for its object to provide an improved rubber tread or similar pliable tread for the calks thereof.

Generally stated, the invention consists of the novel devices and combinations of devices hereinafter described and defined in the claim.

In the accompanying drawings which illustrate the invention, like characters indicate like parts throughout the several views.

Referring to the drawings: Figure 1 is a bottom plan view showing the improved shoe; Fig. 2 is a side elevation of the shoe with some parts broken away and some parts sectioned; Fig. 3 is a vertical section showing in detail one of the calks with its rubber tread applied; and Fig. 4 is a view corresponding to Fig. 3 but with the rubber tread removed from, but in position to be inserted into the said calk.

The shoe 1 may be of any suitable construction. As shown, it is provided with two toe calks and two heel calks. All of these calks, as shown, are alike, but in some instances, the toe calks might vary in form from the heel calks. As illustrated, each detachable calk comprises a cup-shaped body 2, and a tapered stem or shank 3, which latter is adapted to be driven into correspondingly formed seats in the shoe. The interior wall of the cup-shaped body 2 of the calk is formed with downwardly converging conical surfaces $2^a$ that unite with downwardly flaring conical surfaces $2^b$.

The pliable tread 4 will usually be constructed of rubber, or rubber combined with other materials, to afford a strong but elastic cushion having good wearing qualities, but other pliable materials, if found practicable, may be employed. The tread 4 is formed with a shank 5 which has a V-shaped annular channel 6 running around its periphery, and, in shape, corresponding closely to the interior wall of the cup 2, into which it is adapted to be driven. The extreme upper edge of the shank 5 is preferably tapered so that when it is engaged with the outwardly flaring portion or bell-mouth surface $2^b$ of the calk, is adapted to be contracted by pressure, and thus sprung and driven into the cup-shaped body of the calk. The above noted form of the interior wall of the cup of the calk and of the shank of the tread will securely hold the said parts engaged, as shown in Fig. 3, so that there will be no accidental displacement of the tread.

It will be seen that with the above described construction, the pliable or elastic treads may be removed from, and others replaced in the cup-shaped bodies of the calks while the calks are applied to the shoes, or that the calks, bodily, may be removed from the shoe and new calks with new treads substituted. Preferably, the pliable or elastic calk treads on the lower or ground-engaging surface, are cross-grooved, or otherwise roughened, so as to decrease the tendency thereof to slip.

The well known purpose of pliable treads for horse shoe calks, is to protect the horse's feet from the severe jars incident to driving over concrete and other hard roads, and also to prevent slipping on ice or slippery roads.

Preferably the flaring shank and the tread is made round in cross section, but this is not necessarily so. In some instances, it might be made oblong, and in some instances it might even be made square or polygonal. In all of these cases, however, the interior of the cup-shaped portion of the calk and the shank on the tread would be so formed that when driven together, they would have a dove-tailed engagement serving to hold the tread against accidental displacement.

What I claim is:

A cup-shaped metallic horse shoe calk provided with a shank adapted to be inserted into a seat in a horse shoe, the interior of said calk having a downwardly converging interior surface and a downwardly flaring surface below the same, and a calk tread of pliable or elastic material formed with a shank that is provided with a peripheral channel that is approximately V-shaped in cross section and having a tapered extremity above said V-shaped channel which adapts the said shank to be compressed and forced into the said calk, and, by its expansion therein, to hold the said tread to the said calk.

In testimony whereof I affix my signature in presence of two witnesses.

PATRICK J. RYAN.

Witnesses:
F. D. MERCHANT,
HARRY D. KILGORE.

Copies of this patent may be obtained for five cents each, by addressing the "Commissioner of Patents, Washington, D. C."